United States Patent
Malofsky et al.

(10) Patent No.: US 9,752,059 B2
(45) Date of Patent: Sep. 5, 2017

(54) PLASTICS BONDING SYSTEMS AND METHODS

(71) Applicant: Sirrus, Inc., Loveland, OH (US)

(72) Inventors: Bernard Miles Malofsky, Bloomfield, CT (US); Adam Gregg Malofsky, Loveland, OH (US); Matthew McBrayer Ellison, Mason, OH (US); Joseph D. Desousa, Cincinnati, OH (US)

(73) Assignee: Sirrus, Inc., Loveland, OH (US)

( * ) Notice: Subject to any disclaimer, the term of this patent is extended or adjusted under 35 U.S.C. 154(b) by 0 days.

(21) Appl. No.: 14/678,126

(22) Filed: Apr. 3, 2015

(65) Prior Publication Data
US 2015/0210894 A1 Jul. 30, 2015

Related U.S. Application Data

(63) Continuation of application No. PCT/US2013/070355, filed on Nov. 15, 2013.

(60) Provisional application No. 61/727,427, filed on Nov. 16, 2012, provisional application No. 61/904,271, filed on Nov. 14, 2013.

(51) Int. Cl.
| | |
|---|---|
| B32B 7/10 | (2006.01) |
| B32B 7/12 | (2006.01) |
| B32B 27/06 | (2006.01) |
| B32B 27/26 | (2006.01) |
| C09J 5/04 | (2006.01) |
| C09J 11/06 | (2006.01) |
| C09J 4/00 | (2006.01) |
| B32B 37/00 | (2006.01) |
| B32B 37/18 | (2006.01) |
| B32B 38/00 | (2006.01) |
| C09J 5/00 | (2006.01) |
| B32B 27/14 | (2006.01) |

(52) U.S. Cl.
CPC ........ *C09J 4/00* (2013.01); *B32B 7/12* (2013.01); *B32B 37/0038* (2013.01); *B32B 37/182* (2013.01); *B32B 38/0012* (2013.01); *C09J 5/00* (2013.01); *C09J 5/04* (2013.01); *B32B 7/10* (2013.01); *B32B 27/06* (2013.01); *B32B 27/14* (2013.01); *B32B 27/26* (2013.01); *B32B 2038/0016* (2013.01); *B32B 2250/02* (2013.01); *B32B 2605/00* (2013.01); *C09J 11/06* (2013.01); *C09J 2400/20* (2013.01); *C09J 2400/226* (2013.01); *Y10T 428/287* (2015.01); *Y10T 428/2891* (2015.01); *Y10T 428/31645* (2015.04); *Y10T 428/31692* (2015.04); *Y10T 428/31895* (2015.04); *Y10T 428/31938* (2015.04)

(58) Field of Classification Search
None
See application file for complete search history.

(56) References Cited

U.S. PATENT DOCUMENTS

| | | |
|---|---|---|
| 2,212,506 A | 8/1940 | Bachman et al. |
| 2,245,567 A | 6/1941 | Brant et al. |
| 2,277,479 A | 3/1942 | D'Alelio |
| 2,313,501 A | 3/1943 | Bachman et al. |
| 2,330,033 A | 9/1943 | D'Alelio |
| 2,403,791 A | 7/1946 | D'Alelio |
| 2,726,204 A | 12/1955 | Kilbourne et al. |
| 2,730,457 A | 1/1956 | Green et al. |
| 3,042,710 A | 7/1962 | Dickstein et al. |
| 3,140,276 A | 7/1964 | Forster |
| 3,197,318 A | 7/1965 | Halpern et al. |
| 3,203,915 A | 8/1965 | D'Alelio |
| 3,221,745 A | 12/1965 | Coover, Jr. et al. |
| 3,385,777 A | 5/1968 | Haycock et al. |
| 3,427,250 A | 2/1969 | Haas et al. |
| 3,489,663 A | 1/1970 | Bayer et al. |
| 3,523,097 A | 8/1970 | Coover, Jr. et al. |
| 3,557,185 A | 1/1971 | Ito et al. |

(Continued)

FOREIGN PATENT DOCUMENTS

| | | |
|---|---|---|
| CN | 102901754 A | 1/2013 |
| DE | 19508049 A1 | 9/1996 |

(Continued)

OTHER PUBLICATIONS

M. McCoy, "A New Way to Stick" Chemical & Engineering News, vol. 26, Issue 26 (Jun. 30, 2014), pp. 17-18.
International Search Report (ISR) and Written Opinion of the Searching Authority in App No. PCT/US2015/047445 dated as mailed Nov. 30, 2015.
International Search Report (ISR) and Written Opinion of the Searching Authority in App No. PCT/US2015/047466 dated as mailed Dec. 1, 2015.

(Continued)

*Primary Examiner* — Ramsey Zacharia
(74) *Attorney, Agent, or Firm* — Ulmer & Berne, LLP (57) ABSTRACT

Reactive composition includes a reactive component able to form an adhesive bond between two substrates, at least one of which comprises a plastic material. The substrate may include an initiator on or near the surface thereof. The initiator may be present in the plastic material inherently, by blending in an additive package, through injection molding, or other process. The reactive component may comprise a methylene malonate, a reactive multifunctional methylene, a methylene beta ketoester, a methylene beta diketone. A carrier component for the reactive component may be selected to interact with the plastic substrate to soften and/or penetrate the surface to be bonded. The surface of the plastic may be abraded or otherwise treated to expose the initiator. The reactive component, upon contact with a suitable initiator, is able to polymerize to form an interpenetrating polymer weld.

11 Claims, 1 Drawing Sheet

(56) References Cited

U.S. PATENT DOCUMENTS

| | | |
|---|---|---|
| 3,591,676 A | 7/1971 | Hawkins et al. |
| 3,595,869 A | 7/1971 | Shuman |
| 3,677,989 A | 7/1972 | Jenkinson |
| 3,728,373 A | 4/1973 | Imohel et al. |
| 3,758,550 A | 9/1973 | Eck et al. |
| 3,759,797 A | 9/1973 | Masunaga et al. |
| 3,923,836 A | 12/1975 | Bender et al. |
| 3,936,486 A | 2/1976 | Egger et al. |
| 3,940,362 A | 2/1976 | Overhults |
| 3,945,891 A | 3/1976 | Aal et al. |
| 3,966,562 A | 6/1976 | Mukushi et al. |
| 3,975,422 A | 8/1976 | Buck |
| 3,978,422 A | 8/1976 | Rheinfelder |
| 3,995,489 A | 12/1976 | Smith et al. |
| 4,001,345 A | 1/1977 | Gorton et al. |
| 4,004,984 A | 1/1977 | Margen |
| 4,018,656 A | 4/1977 | Rogers et al. |
| 4,035,243 A | 7/1977 | Katz et al. |
| 4,036,985 A | 7/1977 | Amato et al. |
| 4,046,943 A | 9/1977 | Smith et al. |
| 4,049,698 A | 9/1977 | Hawkins et al. |
| 4,056,543 A * | 11/1977 | Ponticello ............... 549/513 |
| 4,079,058 A | 3/1978 | Ackermann et al. |
| 4,080,238 A | 3/1978 | Wolinski et al. |
| 4,083,751 A | 4/1978 | Choi et al. |
| 4,102,809 A | 7/1978 | Smith et al. |
| 4,105,688 A | 8/1978 | Arni et al. |
| 4,118,422 A | 10/1978 | Klein |
| 4,140,584 A | 2/1979 | Margen |
| 4,148,693 A | 4/1979 | Williamson |
| 4,154,914 A | 5/1979 | Kuraya |
| 4,160,864 A | 7/1979 | Ponticello et al. |
| 4,176,012 A | 11/1979 | Bryant |
| 4,186,058 A | 1/1980 | Katz et al. |
| 4,186,060 A | 1/1980 | Katz et al. |
| 4,198,334 A | 4/1980 | Rasberger |
| 4,224,112 A | 9/1980 | Childs |
| 4,229,263 A | 10/1980 | Childs |
| 4,236,975 A | 12/1980 | Childs |
| 4,237,297 A | 12/1980 | Rody et al. |
| 4,243,493 A | 1/1981 | Gruber et al. |
| 4,256,908 A | 3/1981 | Nishimura et al. |
| 4,282,067 A | 8/1981 | Katz et al. |
| 4,282,071 A | 8/1981 | Sherrod |
| 4,291,171 A | 9/1981 | Baum et al. |
| 4,313,865 A | 2/1982 | Teramoto et al. |
| 4,319,964 A | 3/1982 | Katz et al. |
| 4,329,479 A | 5/1982 | Yabutani et al. |
| 4,396,039 A | 8/1983 | Klenk et al. |
| 4,399,300 A | 8/1983 | Prange et al. |
| 4,411,740 A | 10/1983 | Flaningam et al. |
| 4,440,601 A | 4/1984 | Katz et al. |
| 4,440,910 A | 4/1984 | O'Connor |
| 4,443,624 A | 4/1984 | Prange et al. |
| 4,444,928 A | 4/1984 | Karrer |
| 4,450,067 A | 5/1984 | Angevine et al. |
| 4,504,658 A | 3/1985 | Narisada et al. |
| 4,510,273 A | 4/1985 | Miura et al. |
| 4,517,105 A | 5/1985 | Laemmle et al. |
| 4,539,423 A | 9/1985 | Itatani et al. |
| 4,556,649 A | 12/1985 | Salzburg et al. |
| 4,560,723 A | 12/1985 | Millet et al. |
| 4,578,503 A | 3/1986 | Ishikawa et al. |
| 4,584,064 A | 4/1986 | Ciais et al. |
| 4,613,658 A | 9/1986 | Mathias et al. |
| 4,698,333 A | 10/1987 | Fauss et al. |
| 4,720,543 A | 1/1988 | McPherson et al. |
| 4,724,053 A | 2/1988 | Jasne |
| 4,727,801 A | 3/1988 | Yokoi et al. |
| 4,728,701 A | 3/1988 | Jarvis et al. |
| 4,736,056 A | 4/1988 | Smith et al. |
| 4,767,503 A | 8/1988 | Crescentini et al. |
| 4,769,464 A | 9/1988 | Sajtos |
| 4,783,242 A | 11/1988 | Robbins |
| 4,828,882 A | 5/1989 | Tsezos et al. |
| 4,835,153 A | 5/1989 | Kabota et al. |
| 4,840,949 A | 6/1989 | Korbonits et al. |
| 4,897,473 A | 1/1990 | Dombek |
| 4,914,226 A | 4/1990 | Di Trapani et al. |
| 4,931,584 A | 6/1990 | Bru-Magniez et al. |
| 4,932,584 A | 6/1990 | Yamazaki et al. |
| 5,021,486 A | 6/1991 | Galbo |
| 5,039,720 A | 8/1991 | Saatweber et al. |
| 5,064,507 A | 11/1991 | O'Donnell et al. |
| 5,142,098 A | 8/1992 | Bru-Magniez et al. |
| 5,162,545 A | 11/1992 | Etzbach et al. |
| 5,210,222 A | 5/1993 | O'Murchu |
| 5,227,027 A | 7/1993 | Topper |
| 5,259,835 A | 11/1993 | Clark et al. |
| 5,284,987 A | 2/1994 | Sikkenga et al. |
| 5,292,937 A | 3/1994 | Manning et al. |
| 5,312,864 A | 5/1994 | Wenz et al. |
| 5,328,687 A | 7/1994 | Leung et al. |
| 5,334,747 A | 8/1994 | Steffen |
| 5,397,812 A | 3/1995 | Usami et al. |
| 5,426,203 A | 6/1995 | Sohn et al. |
| 5,446,195 A | 8/1995 | Pacifici |
| 5,514,371 A | 5/1996 | Leung et al. |
| 5,514,372 A | 5/1996 | Leung et al. |
| 5,550,172 A | 8/1996 | Regula et al. |
| 5,565,525 A | 10/1996 | Morimoto et al. |
| 5,567,761 A | 10/1996 | Song |
| 5,575,997 A | 11/1996 | Leung et al. |
| 5,582,834 A | 12/1996 | Leung et al. |
| 5,624,669 A | 4/1997 | Leung et al. |
| 5,693,621 A | 12/1997 | Toepfer et al. |
| 5,817,742 A | 10/1998 | Toepfer et al. |
| 5,817,870 A | 10/1998 | Haas et al. |
| 5,886,219 A | 3/1999 | Steffen |
| 5,902,896 A | 5/1999 | Bauer |
| 5,952,407 A | 9/1999 | Rasoul et al. |
| 6,057,402 A | 5/2000 | Zhou et al. |
| 6,069,261 A | 5/2000 | Hoffmann et al. |
| 6,106,807 A | 8/2000 | Albayrak et al. |
| 6,143,352 A | 11/2000 | Clark et al. |
| 6,183,593 B1 * | 2/2001 | Narang et al. ............... 156/327 |
| 6,210,474 B1 | 4/2001 | Romano, Jr. et al. |
| 6,211,273 B1 | 4/2001 | Bru-Magniez et al. |
| 6,225,038 B1 | 5/2001 | Smith et al. |
| 6,238,896 B1 | 5/2001 | Ozaki et al. |
| 6,245,933 B1 | 6/2001 | Malofsky et al. |
| 6,284,915 B2 | 9/2001 | Hirase et al. |
| 6,291,703 B1 | 9/2001 | Schaerfl, Jr. et al. |
| 6,376,019 B1 | 4/2002 | Leung |
| 6,395,737 B1 | 5/2002 | Defossa et al. |
| 6,395,931 B1 | 5/2002 | Carvalho et al. |
| 6,413,415 B1 | 7/2002 | Weiss et al. |
| 6,420,468 B2 | 7/2002 | Bru-Magniez et al. |
| 6,440,461 B1 | 8/2002 | Bru-Magniez et al. |
| 6,512,023 B1 | 1/2003 | Malofsky et al. |
| 6,518,677 B1 | 2/2003 | Capote et al. |
| 6,545,097 B2 | 4/2003 | Pinchuk et al. |
| 6,559,264 B1 | 5/2003 | Konig et al. |
| 6,610,078 B1 | 8/2003 | Bru-Magniez et al. |
| 6,613,934 B1 | 9/2003 | Jegelka et al. |
| 6,673,957 B2 | 1/2004 | Bartek et al. |
| 6,699,928 B2 | 3/2004 | Cobbley et al. |
| 6,716,355 B1 | 4/2004 | Hanemaaijer et al. |
| 6,750,298 B1 | 6/2004 | Bru-Magniez et al. |
| 6,794,365 B2 | 9/2004 | Al-Obeidi et al. |
| 6,841,064 B1 | 1/2005 | Weiss et al. |
| 6,936,140 B2 | 8/2005 | Paxton et al. |
| 7,070,675 B2 | 7/2006 | Schmidt et al. |
| 7,109,369 B2 | 9/2006 | Nose et al. |
| 7,169,727 B2 | 1/2007 | Thorman |
| 7,208,621 B2 | 4/2007 | Nose et al. |
| 7,226,957 B1 | 6/2007 | Scranton et al. |
| 7,305,850 B2 | 12/2007 | Tonkovich et al. |
| 7,450,290 B2 | 11/2008 | Xu et al. |
| 7,553,989 B2 | 6/2009 | Sawabe et al. |
| 7,603,889 B2 | 10/2009 | Cypes et al. |
| 7,610,775 B2 | 11/2009 | Tonkovich et al. |
| 7,649,108 B2 | 1/2010 | Schal et al. |
| 7,659,423 B1 | 2/2010 | McArdle |

(56) References Cited

U.S. PATENT DOCUMENTS

| | | | |
|---|---|---|---|
| 7,663,000 B2 | 2/2010 | Dekkers et al. |
| 7,678,847 B2 | 3/2010 | Yan et al. |
| 7,771,567 B2 | 8/2010 | Rives et al. |
| 7,900,558 B2 | 3/2011 | Yokoi |
| 8,119,214 B2 | 2/2012 | Schwantes et al. |
| 8,206,570 B2 | 6/2012 | Deniau |
| 8,318,060 B2 | 11/2012 | Sundberg et al. |
| 8,425,999 B2 | 4/2013 | McArdle et al. |
| 8,609,885 B2 | 12/2013 | Malofsky et al. |
| 8,884,051 B2 | 11/2014 | Malofsky et al. |
| 9,108,914 B1 | 8/2015 | Malofsky et al. |
| 9,181,365 B2 | 11/2015 | Malofsky et al. |
| 9,217,098 B1 | 12/2015 | Stevenson et al. |
| 9,221,739 B2 | 12/2015 | Malofsky et al. |
| 9,234,107 B2 | 1/2016 | Malofsky et al. |
| 9,334,430 B1 | 5/2016 | Stevenson et al. |
| 9,481,640 B2 | 11/2016 | McArdle et al. |
| 2001/0005572 A1 | 6/2001 | Lobo et al. |
| 2001/0034300 A1 | 10/2001 | Yurugi et al. |
| 2002/0143128 A1 | 10/2002 | Cabioch et al. |
| 2002/0151629 A1 | 10/2002 | Buffkin et al. |
| 2003/0096069 A1 | 5/2003 | D'Alessio |
| 2003/0199655 A1 | 10/2003 | Yurugi et al. |
| 2004/0057914 A1 | 3/2004 | Bonda et al. |
| 2004/0057916 A1 | 3/2004 | Bonda et al. |
| 2004/0076601 A1 | 4/2004 | Bru-Magniez et al. |
| 2004/0082043 A1 | 4/2004 | Yadav et al. |
| 2004/0086243 A1 | 5/2004 | DiGiovanni et al. |
| 2004/0220060 A1 | 11/2004 | Bartley et al. |
| 2005/0106781 A1 | 5/2005 | Ogata |
| 2006/0001158 A1 | 1/2006 | Matayabas et al. |
| 2006/0073334 A1 | 4/2006 | Schwantes et al. |
| 2006/0167267 A1 | 7/2006 | Chorghade et al. |
| 2006/0197236 A1 | 9/2006 | Basheer et al. |
| 2006/0211809 A1 | 9/2006 | Kodemura et al. |
| 2007/0043145 A1 | 2/2007 | Beck et al. |
| 2007/0049655 A1 | 3/2007 | Yoshimune et al. |
| 2007/0092483 A1 | 4/2007 | Pollock |
| 2007/0222051 A1 | 9/2007 | Yoshimura et al. |
| 2008/0131618 A1 | 6/2008 | Nakamura et al. |
| 2008/0160305 A1 | 7/2008 | Warren et al. |
| 2008/0187655 A1 | 8/2008 | Markle et al. |
| 2008/0227919 A9 | 9/2008 | Li et al. |
| 2008/0241485 A1 | 10/2008 | Shimohara et al. |
| 2008/0286333 A1 | 11/2008 | Kangas et al. |
| 2009/0087151 A1 | 4/2009 | Benjamin et al. |
| 2009/0200652 A1 | 8/2009 | Oh et al. |
| 2009/0203861 A1 | 8/2009 | Lee et al. |
| 2009/0263604 A1 | 10/2009 | Arai et al. |
| 2009/0286433 A1 | 11/2009 | Watanabe |
| 2009/0289032 A1 | 11/2009 | Flanagan et al. |
| 2010/0016508 A1 | 1/2010 | Sasagawa et al. |
| 2010/0059179 A1 | 3/2010 | Tribelhorn et al. |
| 2010/0124649 A1 | 5/2010 | Rukavina et al. |
| 2010/0256720 A1 | 10/2010 | Overstreet et al. |
| 2010/0286438 A1 | 11/2010 | Malofsky et al. |
| 2011/0015406 A1 | 1/2011 | Umetani et al. |
| 2011/0024392 A1 | 2/2011 | Sato et al. |
| 2011/0151243 A1 | 6/2011 | McArdle et al. |
| 2011/0164322 A1 | 7/2011 | Morozumi et al. |
| 2011/0244010 A1 | 10/2011 | Doshi |
| 2011/0255156 A1 | 10/2011 | Jethmalani et al. |
| 2012/0083523 A1 | 4/2012 | Richard et al. |
| 2012/0136130 A1 | 5/2012 | Takashima et al. |
| 2012/0261807 A1 | 10/2012 | Itoh et al. |
| 2012/0315388 A1 | 12/2012 | Burckhardt et al. |
| 2013/0281580 A1 | 10/2013 | Malofsky et al. |
| 2013/0303719 A1 | 11/2013 | Malofsky et al. |
| 2014/0058031 A1 | 2/2014 | Overbeek et al. |
| 2014/0173889 A1 | 6/2014 | Johnson et al. |
| 2014/0248485 A1 | 9/2014 | Malofsky et al. |
| 2014/0275400 A1 | 9/2014 | Chen et al. |
| 2014/0288230 A1 | 9/2014 | Malofsky et al. |
| 2014/0329980 A1 | 11/2014 | Malofsky et al. |
| 2015/0056879 A1 | 2/2015 | Malofsky et al. |
| 2015/0104660 A1 | 4/2015 | Malofsky et al. |
| 2015/0148480 A1 | 5/2015 | Ellison et al. |
| 2015/0210894 A1 | 7/2015 | Malofsky et al. |
| 2015/0303122 A1 | 10/2015 | Malofsky et al. |
| 2015/0361283 A1 | 12/2015 | Malofsky et al. |

FOREIGN PATENT DOCUMENTS

| | | |
|---|---|---|
| EP | 1505090 A1 | 2/2005 |
| FR | 2788516 A1 | 7/2000 |
| GB | 432628 | 7/1935 |
| GB | 65767 | 8/1964 |
| GB | 965676 | 8/1964 |
| GB | 975733 | 11/1964 |
| JP | S5681537 A | 7/1981 |
| JP | 02-281013 | 11/1990 |
| JP | H08231564 | 9/1996 |
| JP | 09258448 A | 10/1997 |
| JP | 200019936 | 7/2000 |
| JP | 2004-304125 A | 10/2004 |
| JP | 2008174494 | 1/2007 |
| JP | 2011-025247 A | 2/2011 |
| WO | 99/46619 | 9/1999 |
| WO | 99/55394 | 11/1999 |
| WO | 0121326 A1 | 3/2001 |
| WO | 2006-098514 A1 | 9/2006 |
| WO | 2007/120630 | 10/2007 |
| WO | 2010/129068 A1 | 11/2010 |
| WO | 2011/059104 | 12/2011 |
| WO | 2011/161045 | 12/2011 |
| WO | 2012/054616 A2 | 4/2012 |
| WO | 2012/054633 A2 | 4/2012 |
| WO | 2013059473 A2 | 4/2013 |
| WO | 2013/066629 | 5/2013 |
| WO | 2013/149173 A1 | 10/2013 |
| WO | 2013149165 A1 | 10/2013 |
| WO | 2013149168 A1 | 10/2013 |

OTHER PUBLICATIONS

International Search Report (ISR) and Written Opinion of the Searching Authority in App No. PCT/US2015/048846 dated as mailed Dec. 4, 2015.

European Search Report of the European Patent Office, Issued in European Application No. 13767993.2-1302 / 2831185; dated as mailed on Jan. 7, 2016; 14 pages.

M. Ware et al.: "DBU: An Efficient Catalyst for Knoeveganel Condensation under Solvent-free Condition," Bulletin of the Catalysis Society of India, (2007), vol. 6, pp. 104-106.

V. G. Nenajdenko et al.: "Reaction of 2-Methylene-1,3-Dicarbonyl Compounds Containing a CF3-Group with 1,3-Dienes," Tetrahedron, (2000), vol. 56, pp. 6549-6556.

J. S. Yadav et al.: "Phosphane-Catalyzed Knoevenagel Condensation: a Facile Synthesis of a-Cyanoacrylates and a-Cyanoacrylonitriles," Eur. J. Orq. Chem. (2004), pp. 546-551.

B. C. Ranu et al.: "Ionic Liquid as Catalyst and Reaction Medium—a Simple, Efficient and Green Procedure for Knoevenagel Condensation of Aliphatic and Aromatic Carbonyl Compounds Using a Task-Specific Basic Ionic Liquid," Euro. J. Org. Chem., (2006), pp. 3767-3770.

H. A. Oskooie et al.: "On Water: an Efficient Knoevenagel Condensation using 12-Tungstophosphoric Acid as a Reusable Green Catalyst," Synthetic Communications, (2006), vol. 36, pp. 2819-2823.

H. Jiang et al.: "Inorganic Zinc Salts Catalyzed Knoevenagel Condensation at Room Temperature without Solvent," Preparative Biochemistry & Biotechnology, (2009), vol. 39, pp. 194-200.

B. M. Reddy et al.: "An Easy-to-use Heterogeneous Promoted Zirconia Catalyst for Knoevenagel Condensation in liquid Phase under Solvent-Free conditions," Journal of Molecular Catalysis A: Chemical, (2006), vol. 258, pp. 302-307.

D. H. Jung et al.: "New and General Methods for the Synthesis of Arylmethylene Bis(3-Hydroxy-2-Cyclohexene-1-Ones) and Xanthenediones by EDDA and In(OTf)3-Catalyzed One-Pot (56) References Cited

OTHER PUBLICATIONS

Domino Knoevenagel/Michael or Koevenagel/Michael/ Cyclodehydration Reactions," Bull. Korean Chem. Soc. (2009) vol. 30, No. 9, pp. 1989-1995.
P. Klemarczyk: "Adhesion Studies of Mixtures of Ethyl Cyanoacrylate with a Difunctional Cyanoacrylate Monomer and with other Electron-deficient Olefins," J. Adhesion, (1999), vol. 69, pp. 293-306.
P. Klemarwczyk: "A General Synthesis of 1,1 Disubstituted Electron Deficient Olefins and their Polymer Properties," Polymer, (1998), vol. 39, No. 1, pp. 173-181.
Charansingh Gill et al. "Knoevenagel Condensation in Neutral Media: A Simple and Efficient Protocol for the Synthesis of Electrophillic Alkenes Catalyzed by Anhydrous Ferric Sulphate with Remarkable Reusability." Bulletin of the Catalysis Society of India 7 (2008): 153-157.
P. Ballesteros et al.: "Dl-tert-Butyl Methylenemalonate [Propanedioic Acid, Methylene-, bis(1, 1-dimethylethyl)ester]," Organic Syntheses. Coil. (1990), vol. 7, p. 142 ; (1986) vol. 64, p. 63.
A. M. Vetrova et al.: "Improvement of the Thermal Stability of Cyanoacrylate Adhesives," Polymer Science, Series D, (2009), vol. 2, No. 1, pp. 27-30.
A. C. Cope: "Condensation Reactions. I. The Condensation of Ketones with Cyanoacetic Esters and the Mechanism of the Knoevenagel Reaction," Condensation of Ketones with Cyanoacetic Esters, (1937), vol. 59, pp. 2327-2330.
G. Lai et al.: "Ionic Liquid Functionalized Silica Gel: Novel Catalyst and Fixed Solvent," Tetrahedron Letters (2006), vol. 47, pp. 6951-6953.
J. R. Harjani et al.: "Lewis Acidic Ionic Liquids for the Synthesis of Electrophilic Alkenes via the Knoevenagel Condensation," Tetrahedron Letters, (2002), vol. 43, pp. 1127-1130.
P. Ballesteros et al.: "Synthesis of Dl-tert-Butyl Methylenemalonate, a Sterically Hindered 1,1-Dicarbonyl Alkene," J. Org. Chem, (1983), vol. 48, pp. 3603-3605.
T. Doi et al.: "Synthesis of Dimethyl gloiosiphne A by Way of Palladium-Catalyzed Domino Cyclization," J. Org. Chem., (2007), vol. 72, pp. 3667-3671.
Takagi et al.: Kogyo Kagaku Zasshi, Reaction of Active Methylene Radicals with Formaldehyde. L. Synthesis of Diethyl Methylenemalonate, 1953, 56, pp. 901-903, English abstract.
McNab, Kirk-Othmer Encyclopedia of chemical Technology, Pyrolysis, Flash Vacuum, 2009, John Wiley & Sons, Inc., pp. 1-26.
Block, "Diethyl bis (hydroxymethyl) malonate" Organic Syntheses, 1973, Coll. vol. 5, p. 381 [vol. 40, p. 27 (1960); Retrieved on Apr. 4, 2014 from internet: http://www.Orgsyn.org/content/pdfs/procedures/cv5p0381.pdf] p. 381, para 1. 1781-026 WO.
Magdalini Matziari et al. "Active methylene phosphinic peptides: a new diversification approach", Organic Letters., vol. 8, No. 11, 2006, pp. 2317-2319, USACS, Washington DC, ISSN: 1523-7060.
Zaragoza Dorwald, Side Reactions in Organic Synthesis, 2005, Wiley-VCH Verlag GmbH & Co., KgaA, Weinheim, Preface. p. IX.
K. Okamura and T. Date, A Facile Conversion of Ethoxydihydropyrans to 4-Cyanoethylisoxazoles, J. Heterocyclic Chem. 33, 383 (1996).
Valentine G. Nenajdenko et al, Reaction of 2-Methylene-1,3-dicarbonyl Compounds Containing a CF3-Group with 1,3-Dienes Tetrahedron 56 (2000) 6549-6556.
Yamauchi et al. "Reactivity of 2-methyene-1,3-dicarbonyl compounds: catalytic enantioselective Diels-Alder reaction", Tetrahedron Asymetry 12, (2001), 3113-3118.
Cristoph Schotes et al. "Cu(I)- and C(II)-Catalyzed Cyclo- and Michael Addition Reactions of Unsaturated [beta]-Ketoesters" The Journal of Organic Chemistry, vol. 76, No. 14 dated Jul. 15, 2011 p. 5862-5866.
Alejandro Bugarin et al. "Efficient direct [alpha]-methylenation of carbonyls mediated by dissopropylammonium trifluoroacetate", Chemical Communications, vol. 46, No. 10 dated Jan. 1, 2010.

H. Hoffman et al. "Preparation and Selected Reaction of tery-Butyl 2-Methylene-3-oxoalkanoates" Chem. Ber., vol. 124 dated Jan. 1, 1991, pp. 2475-2480.
M. Yamauchi et al. "Reactivity of 2-Methylene-1, 3-dicarbonyl Compounds. 1,3-Dipolar Cycloaddition Reaction with Ethyl Diazoacetate", Chem. Pham. Bull., vol. 49, No. 12, dated Jan. 1, 2001, pp. 1638-1639.
Lawrence N J et al. "Reaction of Baylis-Hillman products with Swern and Dess-Martin oxidants", Tetrahedron Letters, Pergamon, GB, vol. 42 No. 23 dated Jun. 4, 2001, pp. 3939-3941.
Juliana Vale et al. "Efficient [alpha]-Methylenation of Carbonyl Compounds in Ionic Liquids at Room Temperature", SYNLETT, vol. 2009, No. 01, Jan. 1, 2009 (Jan. 1, 2009), pp. 75-78, XP055170349, ISSN: 0936-5214, DOI: 10.1055/s-0028-1087389 *table 2; compound 3 *.
Weiss et al. Miniemulsion Polymerization as a Means to Encapsulate Organic and Inorganic Materials, Adv. Polymer Science, 2010, pp. 1-52, DOI:10.1007/12_2010_61.
Bhatia, Encapsulation of Particles Using Brittle Subterranean Applications, Thesis submitted to College of Engineering and Mineral Resources at West Virginia University in partial fulfillment of the requirements for the degree of Master of Science in Chemical Engineering, 1999.
McFarland et al, Free Radical Frontal Polymerization with a Microencapsulated Initiator, Macromolecules 2004, vol. 37, pp. 6670-6672.
International Search Report (ISR) and Written Opinion of the Searching Authority in App. No. PCT/US2014/011068 dated as mailed May 12, 2014.
International Search Report (ISR) and Written Opinion of the Searching Authority in App. No. PCT/US2011/056903 dated as mailed Jun. 7, 2012.
International Search Report (ISR) and Written Opinion of the Searching Authority in App. No. PCT/US2011/056926 dated as mailed Feb. 28, 2012.
International Search Report (ISR) and Written Opinion of the Searching Authority in App. No. PCT/US2012/060830 dated as mailed Feb. 1, 2013.
International Search Report (ISR) and Written Opinion of the Searching Authority in App. No. PCT/US2012/060840 dated as mailed Mar. 12, 2013.
International Search Report (ISR) and Written Opinion of the Searching Authority in App. No. PCT/US2012/060837 dated as mailed Jan. 9, 2013.
International Search Report (ISR) and Written Opinion of the Searching Authority in App. No. PCT/US2013/034636 dated as mailed Jun. 20, 2013.
International Search Report (ISR) and Written Opinion of the Searching Authority in App. No. PCT/US2013/034641 dated as mailed Jun. 25, 2013.
International Search Report (ISR) and Written Opinion of the Searching Authority in App. No. PCT/US2013/034649 dated as mailed Aug. 27, 2013.
International Search Report (ISR) and Written Opinion of the Searching Authority in App. No. PCT/US2013/043711 dated as mailed Nov. 22, 2013.
International Search Report (ISR) and Written Opinion of the Searching Authority in App. No. PCT/US2013/070355 dated as mailed Mar. 19, 2014.
International Search Report (ISR) and Written Opinion of the Searching Authority in App. No. PCT/US2013/072203 dated as mailed Apr. 18, 2014.
European Search Report of the European Patent Office, Issued in European Application No. 13770173.6-1301 / 2831124; dated as mailed on Oct. 9, 2015; 7 pages.
U.S. Appl. No. 14/948,734, filed Nov. 23, 2015.
U.S. Appl. No. 15/094,705, filed Apr. 8, 2016.
Bachman et al.: "Diethyl methylenemalonate", May 17, 1939, Eastman Kodak Company, pp. 493-501.
P. Breton et al., "New Poly(Methylidene Malonate 2.1.2) Nanoparticles: Recent Developments", Targeting of Drugs 4, NATO ASI Series, vol. 273, pp. 161-172, 1994.

(56) References Cited

OTHER PUBLICATIONS

Limouzin et al., "Anionic Polymerization of n-Butyl Cyanoacrylate in Emulsion and Miniemulsion" Macromolecules, vol. 36, 2003, pp. 667-674.
"Knoevenagel Condensation Over Acidic Zeolite", Zuo Bojun et al., Chinese Journal ofCatalysis, vol. 23 (6), pp. 555-558.
"Comparison of the catalytic activity of MOFs and zeolites in Knoevenagel condensation", Maksym Opanasenko, et al., Catalysis Science & Technology, vol. 3 p. 500-507.
Corey et al. "Total Synthesis of Gibberellic Acid. A Simple Synthesiss of a Key Intermediate", J. Am. Chem. Soc. 1982, 104, 6129-6130.
Krishna et al. "Stereodefined Access to 3-Deoxy Sugars Through a Tandem Baylis-Hillman and Lewis Acid Catalyzed Reaction Sequence", European Journal of Organic Chemistry, 2010, 813-817.
International Preliminary Report on Patentability in App. No. PCT/US2013/070355 dated as mailed May 19, 2015; 6 pages.
International Search Report (ISR) and Written Opinion of the Searching Authority in App. No. PCT/US2016/027134 dated as mailed Jul. 15, 2016; 7 pages.
International Search Report (ISR) and Written Opinion of the Searching Authority in App. No. PCT/US2016/027099 dated as mailed Jul. 15, 2016; 8 pages.

\* cited by examiner

PLASTICS BONDING SYSTEMS AND METHODS

CROSS REFERENCE TO RELATED APPLICATIONS

This application is a continuation of International Application No. PCT/US2013/070355, filed Nov. 15, 2013, which claims the priority benefit of U.S. Provisional Patent Application No. 61/727,427 filed Nov. 16, 2012 entitled "Plastic Bonding Systems and Methods", and U.S. Provisional Patent Application No. 61/904,271 filed Nov. 14, 2013, entitled "Plastics Bonding Systems and Methods", each of which is incorporated by reference herein in their respective entirely.

BACKGROUND OF THE INVENTION

1. Field of the Invention

Exemplary embodiments disclosed herein relate generally to adhesive systems and methods particularly suitable for bonding plastic substrates.

2. Background

One approach to bonding plastic substrates involves solvent welding. To solvent weld two plastic surfaces, a solvent may be applied to each surface to swell or soften the plastic. When the two surfaces are brought into contact, the polymer chains from one component are able to move and mingle with the loosened polymer chains of the other component. Eventually, the solvent volatilizes and the polymer chains lose mobility. The entangled polymer chains create the solvent weld.

Solvent welding techniques may be used for connecting polyvinyl chloride (PVC), acrylonitrile butadiene styrene (ABS), polycarbonate (PC) or polystyrene (PS) substrates.

However, solvent welding is inadequate for bonding certain plastics and polymers. Thus, improvements in plastics bonding are continuously sought.

Certain adhesives used in industrial applications, particularly the automotive industry, require significant quantities of thermal energy to initiate cure and develop the necessary adhesive physical properties.

In the art, it is desired to provide adhesives, in particular structural adhesives that do not require thermal energy to cure, while offering the required strength, toughness and thermal resistance. In particular, new and improved materials and methods for bonding plastic and composite substrates are continuously sought.

DESCRIPTION OF THE INVENTION

Improved plastics and composites bonding materials, techniques and results are set forth in the exemplary embodiments disclosed herein. The inventive compositions and methods may be used to form adhesive bonds a variety of plastic or polymeric substrates, including dissimilar materials.

Definitions

Unless defined otherwise, all technical and scientific terms used herein have the meaning commonly understood by a person skilled in the art to which this invention belongs. As used herein, the following terms have the meanings ascribed to them below, unless specified otherwise.

As used herein, the term "beta-dicarbonyl" refers to a compound having the general formula

R1-C(O)—CH2-C(O)—R2.

As used herein, the term "exo-methylene derivative compound" refers to a compound having the general formula

R1-C(O)—C(=CH2)—C(O)—R2.

As used herein, the term "polymerizable composition" refers to a monomeric, oligomeric, or polymeric composition or mixture comprising molecules that are able to be polymerized by chain extension, cross-linking, or both.

As used herein, the term "monofunctional" refers to an addition monomer, for example, a methylene malonate, have only one addition polymerizable group.

As used herein, the term "difunctional" refers to a polymerizable-function containing monomer, oligomer, resin or polymer, with two such polymerizable groups which may provide for chain extension, cross-linking, or both.

As used herein, the term "multifunctional" refers to a polymerizable-function containing monomer, oligomer, resin or polymer, with two or more such polymerizable groups which may provide for chain extension, cross-linking, or both. Thus, "difunctional" represents a sub-group of "multifunctional."

As used herein, the term "doped" refers to the presence of a reaction initiator, for example, present on or within a substrate.

As used herein, the term "formulation additives" refers to additives included in a formulated system to enhance physical or chemical properties thereof and to provide a desired result. Such formulation additives include, but are not limited to, dyes, pigments, toughening agents, impact modifiers, rheology modifiers, plasticizing agents, thixotropic agents, natural or synthetic rubbers, filler agents, reinforcing agents, thickening agents, opacifiers, inhibitors, fluorescence markers, thermal degradation reducers, thermal resistance conferring agents, surfactants, wetting agents, and stabilizers.

BRIEF DESCRIPTION OF THE DRAWINGS

So that those having ordinary skill in the art to which the subject invention pertains will more readily understand how to make and use the invention as described herein, preferred embodiments thereof will be described in detail below, with reference to the drawings, wherein.

EXEMPLARY EMBODIMENTS

Certain co-inventors of the instant invention are also inventors of the subject matter disclosed in published patent applications on improved methods of synthesis of methylene malonates, namely, WO 2012/054616 Synthesis of Methylene Malonates Substantially Free of Impurities, and WO 2012/054633 Synthesis or Methylene Malonates Using Rapid Recovery in the Presence of a Heat Transfer Agent. The synthesis procedures provided therein result in improved yields of heretofore-elusive high quality methylene malonates and other polymerizable compositions having the general formula shown below:

(I)

wherein R and R' may be the same or different and may represent nearly any substituent or side-chain.

Certain other monomeric species have been made by certain inventors of the present invention and are disclosed, for example, in co-pending patent applications WO2013/059473, entitled "Multifunctional Monomers, Methods For Making Multifunctional Monomers, Polymerizable Compositions And Products Formed Therefrom," filed Oct. 18, 2012; WO2013/066629, entitled "Methylene Beta-Ketoester Monomers, Methods for Making Methylene Beta-Ketoester Monomers, Polymerizable Compositions and Products Formed Therefrom," filed Oct. 18, 2012; and WO2013/059479, entitled "Methylene Beta-Diketone Monomers, Methods for Making Methylene Beta-Diketone Monomers, Polymerizable Compositions and Products Formed Therefrom, filed Oct. 18, 2012. Each of the cited patent documents are hereby incorporated herein by reference in their entirety.

The referenced multifunctional exo-methylene monomers may be represented by the general formula shown below:

(II)

where $R_1$, $R_2$ may be the same or different and may represent nearly any substituent or side-chain; Q is oxygen or a direct bond; and A is a suitable linking group. The referenced methylene beta ketoesters may be represented by the general formula shown below:

(III)

where $R_1$, $R_2$ may be the same or different and may represent nearly any substituent or side-chain.

The referenced methylene beta diketones may be represented by the general formula shown below:

(IV)

where $R_1$, $R_2$ may be the same or different and may represent nearly any substituent or side-chain.

Each of the exemplary monomers cited above belong to a class of reactive monomers termed herein "exo-methylene derivative compounds." Alternately, the compounds may be considered to be "disubstituted vinyl compounds." Exemplary embodiments disclosed herein provide novel and non-obvious improvements in the use of such reactive monomers for bonding exemplary substrates, in particular plastics, plastics composites and other polymeric substrates.

Exemplary embodiments of the instant invention include plastics bonding adhesive compositions, plastic adhesive bonding systems, methods for bonding plastic substrates, methods for bonding a plastic substrate with a dissimilar material, and assemblies including at least one plastic substrate, and boned articles.

An exemplary method for bonding plastic substrates may include providing a suitable initiator within a plastic substrate, at least near a surface to be bonded, and applying a suitable plastics bonding adhesive composition to at least one of the surfaces to be bonded. The surfaces to be bonded are brought into contact for sufficient time for the adhesive composition to fixture and cure. The plastic substrate may inherently initiate the reactive component. Thus, the plastic may inherently include the initiator.

Exemplary embodiments contemplated herein include bonding dissimilar materials in terms of the type of plastic substrates, or bonding one plastic substrate to glass, metal, wood, or other dissimilar material.

The plastic substrates contemplated for adhesive bonding in accordance with the embodiments disclosed herein include thermoplastic or thermoset materials such as, but not limited to, acetal homopolymers (e.g., Delrin®), acrylic (e.g., PMMA, Plexiglas®), acrylonitrile-butadiene-styrene (ABS), polycarbonate (PC), epoxy matrices, fluoropolymers (e.g., PTFE, FEP, PFA, ETFE, Teflon®), phenolic polymers, polyethylene terephthalates (PET, PET-G), polyamides, polyesters, PEEK, PEI, LDPE, HDPE, PET, polyimides, polypropylene, polystyrene, polyurethane, PVC, vinyl materials, and the like, as well as composite materials including such materials.

In an exemplary embodiment, the plastic substrate may be sufficiently polar to initiate polymerization of the reactive component. In other exemplary embodiments, the substrate may be "doped" with a suitable initiator in an effective amount at or near the surface to initiate polymerization. In an exemplary embodiment, the doped substrate may include from 0.1-50% wt % of an initiator, or combination of initiators. In other exemplary embodiments, the substrate may include from 1-50 wt %, 5-40 wt %, 10-30 wt %, or 15-25 wt % of an initiator (or combination of initiators). In certain embodiments, the substrate may include about 0.1 wt %, 0.5 wt %, 1.0 wt %, 2.5 wt %, 5.0 wt %, 10 wt %, 15 wt %, 20 wt %, 25 wt %, 30 wt %, 35 wt %, 45 wt %, or 50 wt % of an initiator (or combination of initiators). As used herein, numerical ranges include endpoints, and each subset of numerical values encompassed within the numerical range.

Suitable initiators for the reactive components disclosed herein may be present within the plastic substrate, for example, as a result of a blending operation. In other words, the initiator may be included in an additive package. In other exemplary embodiments, the suitable initiators may be present at least on or near the substrate surface due to in injection molding process. Those having skill in the art will appreciate that other methods and means may be utilized to provide suitable initiators on or near the substrate surface. In certain embodiments, the initiators are found within the plastic substrate in a gradient such that more of the initiator is found on or near the surface of the substrate. In certain embodiments, without limitation, the gradient is such that about 20%, about 25%, about 30%, about 35%, about 40%, about 50% or more than 50% of the initiator by weight is located within the portion of the substrate closest to the surface, wherein said portion of the substrate represents about 50%, about 45%, about 40%, about 35%, about 30%, about 25%, about 20%, about 15%, about 10%, about 5%, or about 1% of the total thickness.

In other exemplary embodiments, the initiator may be a polymer present as a discrete phase within the plastic substrate. For example, certain of the exemplary reactive components disclosed herein may be initiated by a polycarbonate material. Thus, polycarbonate in the form of spheres, fibers, chopped fibers, particles, and the like may be present in a plastic substrate. The polycarbonate may be present in an amount suitable to initiate polymerization of the reactive component.

In other exemplary embodiments, the initiator may comprise glass beads, glass fiber, long glass fiber, and the like. In certain embodiments, the initiator is able to perform at least another function, other than reactive component initiation, in the plastic substrate. For example, glass fiber may be utilized as a reinforcing filler within a plastic matrix.

Monomer Studies:

Monofunctional and difunctional methylene malonate monomers and methylene malonate resins were evaluated for adhesive properties on various substrates. One monomer studied was diethyl methylene malonate (DEMM). Another monomer studied was dimethyl methylene malonate (DMMM, D3M). Also, transesterification reaction products formed by reaction of DEMM with different alcohols, diols, polyols were screened.

Formulations:

Based on screening experimental results, formulation development focused on three methylene malonate monomers: DEMM, D3M, and a cross-linkable monomer, 1,6-hexyl bis(diethylmenthlenemalonate) (a transesterification product of DEMM and 1,6-hexanediol, also referred to as 1,6-hexanediol DiDEMM). All references in this disclosure to 1,6-hexanediol DiDEMM** refer to a monomer blend of about 10-12 wt % difunctional monomer carried in DEMM.

TABLE 1

| Formula 1 | Wt. % |
| --- | --- |
| 95% DEMM | 88.5 |
| PMMA | 11.5 |

Environmental conditions: 72° F., 38% RH*

TABLE 2

| Formula 2 | Wt. % |
| --- | --- |
| 95% DEMM | 87.5 |
| PMMA | 11.5 |
| Surface-treated fumed silica | 1.0 |

Environmental conditions: 72° F., 38% RH*

TABLE 3

| Formula 3 | Wt. % |
| --- | --- |
| 1,6-hexanediol DiDEMM** | 95.3 |
| Vamac GXF | 4.7 |

Environmental conditions: 72° F., 34% RH*

TABLE 4

| Formula 4 | Wt. % |
| --- | --- |
| 95 wt % DEMM | 95.8 |
| TS-340 | 4.2 |

Environmental conditions: 70° F., 30% RH*

TABLE 5

| Formula 5 | Wt. % |
| --- | --- |
| 1,6-hexanediol DiDEMM** | 96.2 |
| TS-340 | 3.8 |

Environmental conditions: 70° F., 30% RH*

TABLE 6

| Formula 6 | Wt. % |
| --- | --- |
| D3M | 88.7 |
| PMMA | 4.6 |
| Surface-treated fumed silica | 6.7 |

Environmental conditions: 71° F., 30% RH*

TABLE 7

| Formula 7 | Wt. % |
| --- | --- |
| 1,6-hexanediol DiDEMM** | 92.0 |
| Surface-treated fumed silica | 8.0 |

Environmental conditions: 72° F., 38% RH*

TABLE 8

| Formula 8 | Wt. % |
| --- | --- |
| 1,6-hexanediol DiDEMM** | 99.7 |
| Adhesion Promoter 1 (Acetic Acid) | 0.3 |

Environmental conditions: 72° F., 40% RH*

TABLE 9

| Formula 9 | Wt. % |
| --- | --- |
| 1,6-hexanediol DiDEMM** | 99.7 |
| Adhesion Promoter 2 (Benzoic Acid) | 0.3 |

Environmental conditions: 72° F., 40% RH*

*The polymerization of methylene malonates, their resulting molecular weight, and their final properties can be directly influenced by water content in the formulation. As methylene malonates are hygroscopic, environmental conditions are recorded for the period during formulating.

Formulations were prepared by blending methylene malonates with thickeners, tougheners, fumed silica and additives in polyethylene beakers at 40-50 C using a standard laboratory mixer. Most reagents were added at a slow rate under medium shear (600-1500 rpm) with a propeller blade. The fumed silica required higher shear and the use of a dispersion blade at ~2500 rpm. Formulations were stored in a freezer once complete to minimize stability issues.

The raw materials for the formulations were used as received without any pretreatment except for the PMMA (polymethylmethacrylate), which was heated under vacuum (24 in Hg) at 120° C. for 24 hours. The raw materials used in this study are as follows:

TABLE 10

| Materials Component |
|---|
| 95 wt % DEMM |
| 99 wt % DEMM |
| 1,6-hexanediol DiDEMM** |
| D3M |
| Degacryl M449 (PMMA) |
| Aerosil R-812 (Fumed Silica) |
| VAMAC GXF (terpolymer) |
| TS-340 (chlorosulfated polyethylene) |

Substrates:

Ticona Celtran PP-GF 30-0553: polypropylene 30% glass-filled

Sabic Cycolac ABS MG37EPX: acrylonitrile butadiene styrene

Sabic Cycoloy PC+ABS XCY620: acrylonitrile butadiene styrene/polycarbonate

Dupont Zytel HSLR HTN54G35: 35% glass reinforced polyamide resin

Sabic Noryl GFN2-701: 20% glass reinforced polyphenylene ether/polystyrene

Dupont 70G33HS1L (PA6,6): polyamide nylon

Dupont Crastin (PBT): polybutylene terephthalate

Hifax Trc 779x (TPO): thermoplastic polyolefin

Sabic Noryl SEL GFN2-701 (PPO): glass filled polypropylene oxide

BASF 1503-2f (PA6,6): polyamide nylon

SMC Random: Glass reinforced polyester

Vinyl Ester SMC Glass Fabric: vinyl ester reinforced with glass fabric

Pre-Preg Carbon Fiber: epoxy system with carbon fiber fabric. Fabric is non-crimp stitched fabric. 8 layer lay-up is (0/90/−45/+45)s.)

The substrates were utilized as 4"×1" pre-cut coupons.

Surface Treatment and Activators

A first surface treatment included washing with isopropanol and Kimwipes. For consistency, the surface was sprayed with a squirt bottle on all surfaces and wiped dry, followed by a second washing and air-dried. A second surface treatment was abraded using 120-grit aluminum oxide emery cloth. The abrasion was done either manually or mechanically using a DeWalt palm sander. Each abrasion was followed by isopropanol wash. A third surface treatment, plasma, was used to modify the surface energy of the substrates.

Activators were used for all of the data collected, except for Sabic Cycolac ABS, which did not require an activator. The purpose of the activator, or primer, is to initiate polymerization of the formulation and facilitate cure. Two activator solutions were selected:

0.5 wt. % sodium benzoate in ethanol.

0.5 wt. % 1,1,3,3-tetramethylguanidine in ethanol.

These activators were applied by pipetting one to two drops of the solution onto the bonding area. The excess solution was removed using a pipette. The activator was allowed to air dry prior to use.

The two activators selected represent two chemical categories. Sodium benzoate, an acid salt of benzoic acid, is a mild carboxylate anion capable of anionically initiating methylene malonate monomers. The second activator, 1,1,3,3-tetramethylguanidine, is a strong (pKa~13) organic free-base, which strongly reacts with the monomer.

Tensile Strength Measurements

Qualitative (Fixture) Tensile

Fixture testing was completed on the substrates "as received." "Fixture" refers to the sufficient cure of an adhesive to resist failure in the tensile mode by hand. Formulations or monomers were applied to coupons and assembled using a jig to ensure a consistent ~0.5" overlap. Fixture testing was broken into four categories:

N=no activation, i.e., the adhesive remained wet.

A=polymerization did show activation, however there was no tensile strength.

Y=tensile strength formed, failure occurred in the tensile mode.

YY=tensile strength sufficiently high and did not fail by hand in tensile mode.

Of these categories, quantitative tensile was generally collected for formulations and substrates with a Y or YY fixture strength.

Fixture was tested at 1 hour and 16 hour (ultimate cure) intervals. In the first attempt only Cycolac ABS and Cycoloy PC+ABS showed strong bounding.

This fixture testing approach was used on one to two lap-shear replicates as a method to validate the possibility of sufficient tensile strength.

b. Quantitative Tensile:

Lap-shears were assembled following the drying of the primer solution. Once assembled, the lap-shear was kept together using a standard binder clip.

Tensile data was collected using an Instron with a 3 kN load cell, utilizing a Bluehill software package. The lap-shears were pulled at a rate of 10 mm/min. The overlap was measured using a micrometer for precise area overlap and bond thickness.

From the initial fixture evaluation, ABS and PC+ABS blend exhibited immediate fixture and one hour tensile strengths of 5.00 MPa and 1.00 MPa, respectively, and sixteen hour tensile strengths of 5.40 MPa and 1.80 MPa. In many cases, especially as seen in the ABS and PC+ABS blend, the methylene malonate monomer and formulations can penetrate into the plastic (polymer) matrix enhancing overall tensile strength.

Adhesive samples that yielded a desired tensile strength were subjected to a water soak test. Six lap-shears were submerged in a container of water at 54° C. deionized water for 7 days (168 hours). Once the 7 days were over, three lap-shears were tested for tensile strength immediately without drying and a second three were tested after drying for 24 hours.

Results:

Cycolac ABS MG37EPX

Figure 1:
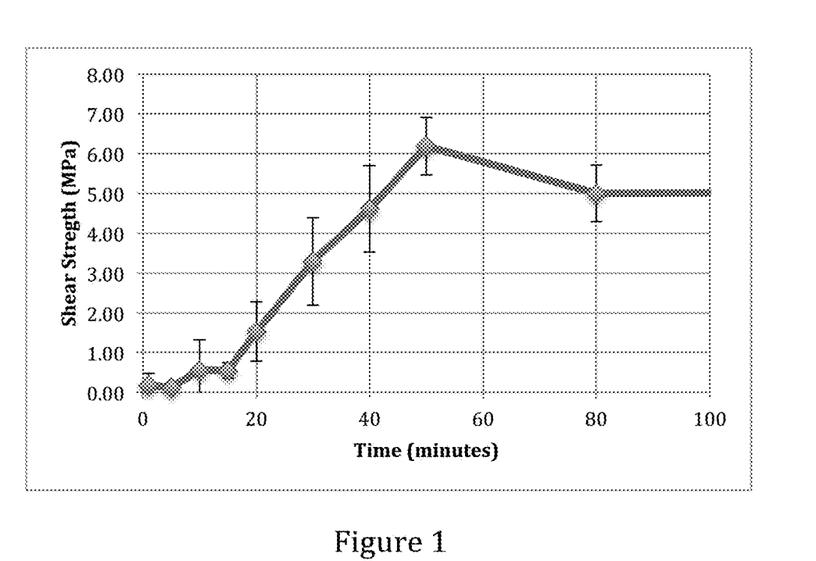
FIG. 1 shows the results of a short term cure speed study of DEMM on ABS.
Figure 2:
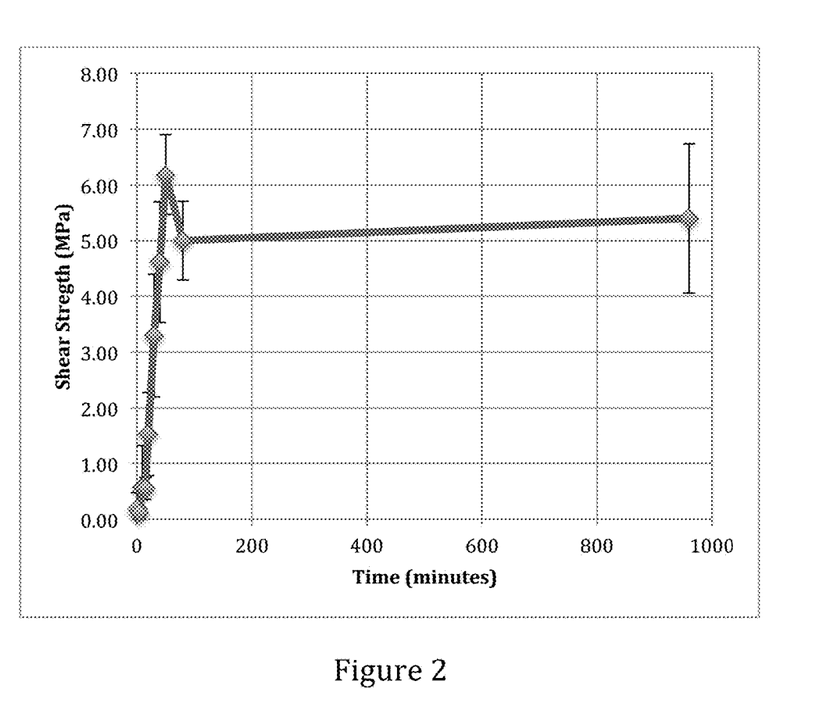
FIG. 2 shows the results of an extended cure speed study of DEMM on ABS.

Cycolac ABS showed the best performance of all the plastic substrates and did not require a separate activator. The hydrolysis testing via the water soak was done on abraded surfaces with and without sodium benzoate as an activator. In each case, i.e., immediately following the soak and after drying, the samples without activator maintained desired tensile strengths. The hydrolytic results were compared to the ultimate shear strength at 16 hours. With the rapid strength build within one hour, a cure study was undertaken on ABS with DEMM. The bulk of the strength build occurs during the 20-40 minute window following application. (See FIGS. 1-2)

The failure mode for most of the specimens was a mix of cohesive and substrate failure. Substrate failure was the common failure mode for those samples showing a tensile strength of greater than 5 MPa. Since the samples failed within the substrate, the 5 MPa tensile strength is more an indication of substrate strength as opposed to the true tensile strength of the adhesive. Following the water soak, though, the failure mode was cohesive.

TABLE 11

ABS Results

| Formulation/Monomer | Activator | Surface | 1 hour (MPa) | 16 hour (MPa) |
|---|---|---|---|---|
| DEMM | None | Abraded | 4.30 +/− 0.20 | 5.14 +/− 0.49 |
| DEMM | Sodium Benzoate | Abraded | 2.33 +/− 1.91 | 3.57 +/− 2.49 |
| DEMM | None | As Received | 5.00 +/− 0.71 | 5.40 +/− 1.34 |
| 1,6-hexanediol DiDEMM** | TMG | As Received | 1.08 +/− 0.29 | |
| Formula 3 | TMG | As Received | 0.78 +/− 0.65 | |

PC+ABS XCY620

On the Cycoloy PC+ABS blend substrate, a combination of abrasion and use of sodium benzoate did achieve a desired tensile strength, which was hydrolytically tested via the water soak test. Both immediately following the soak and after drying, lap-shears suffered over 50% loss in tensile strength. The failure mode for most of the specimens was a mix of cohesive and adhesive. Following the water soak, the failure mode was cohesive.

TABLE 12

PC/ABS Results

| Formulation/Monomer | Activator | Surface | 1 hour (MPa) | 16 hour (MPa) |
|---|---|---|---|---|
| DEMM | None | Abraded | 1.20 +/− 0.07 | 2.88 +/− 0.18 |
| DEMM | Sodium Benzoate | Abraded | 4.14 +/− 0.76 | 4.32 +/− 2.24 |
| DEMM | None | As Received | 1.00 +/− 0.00 | 1.80 +/− 0.84 |
| 1,6-hexanediol DiDEMM** | TMG | As Received | 1.22 +/− 0.14 | |
| Formula 3 | TMG | As Received | 0.56 +/− 0.18 | |

Zytel HSLR HTN54G35

As shown in the table below, the Zytel substrate bonded well using the cross-linkable monomer. The mode of failure for most of the specimens was primarily adhesive.

TABLE 13

Zytel (Glass reinforced polyamide)

| Formulation/Monomer | Activator | Surface | 1 hour (MPa) | 16 hour (MPa) |
|---|---|---|---|---|
| DEMM | None | Abraded | 1.98 +/− 0.10 | 2.70 +/− 0.19 |
| DEMM | Sodium Benzoate | Abraded | 1.32 +/− 0.11 | 1.43 +/− 0.27 |

TABLE 13-continued

Zytel (Glass reinforced polyamide)

| Formulation/Monomer | Activator | Surface | 1 hour (MPa) | 16 hour (MPa) |
|---|---|---|---|---|
| 1,6-hexanediol DiDEMM** | TMG | As Received | 3.01 +/− 0.23 | |
| Formula 3 | TMG | As Received | 2.80 +/− 0.24 | |

Noryl GFN2-701

Noryl GFN2-701 was another example of a substrate that bonds well without requiring an activator but using abrasion. The mode of failure for most of the specimens was mainly adhesive failure.

TABLE 14

Glass reinforced polyphenylene ether/polystyrene

| Formulation/Monomer | Activator | Surface | 1 hour (MPa) | 16 hour (MPa) |
|---|---|---|---|---|
| DEMM | None | Abraded | 4.22 +/− 0.46 | 4.54 +/− 0.54 |
| DEMM | Sodium Benzoate | Abraded | 2.89 +/− 0.57 | 2.30 +/− 0.51 |
| 1,6-hexanediol DiDEMM** | TMG | As Received | 3.94 +/− 0.19 | |
| Formula 3 | TMG | As Received | 3.55 +/− 0.37 | |

Noryl SE1GFN2-701 (PPO)

The Noryl SE1GFN2-701 substrate behaved similarly to the Noryl GFN2-701 virtually all respects. The mode of failure for most of the specimens was mainly adhesive failure.

TABLE 15

Glass filled polypropylene oxide

| Formulation/Monomer | Activator | Surface | 1 hour (MPa) | 16 hour (MPa) |
|---|---|---|---|---|
| DEMM | None | Abraded | 3.15 +/− 1.36 | 4.30 +/− 0.75 |
| DEMM | Sodium Benzoate | Abraded | 2.26 +/− 0.11 | 1.86 +/− 0.24 |
| 1,6-hexanediol DiDEMM** | TMG | As Received | 3.30 +/− 0.18 | |
| Formula 3 | TMG | As Received | 3.93 +/− 0.15 | |

Pre-Preg Carbon Fiber Substrates

Pre-Preg Carbon Fiber samples demonstrated tensile strength without the sodium benzoate activator. Hydrolytic testing via the water soak test was also undertaken for lap-shear with and without sodium benzoate. Both sets suffered some loss of tensile strength after soaking, but the specimens without activator performed better. The mode of failure for most of the specimens was mainly adhesive failure.

TABLE 16

Pre-preg Carbon Fiber

| Formulation/Monomer | Activator | Surface | 1 hour (MPa) | 16 hour (MPa) |
|---|---|---|---|---|
| DEMM | None | Abraded | 4.65 +/− 1.91 | 5.20 +/− 1.71 |
| DEMM | Sodium Benzoate | Abraded | 2.55 +/− 0.32 | 4.37 +/− 0.52 |

The remaining plastic composite substrates all demonstrated varying levels of activation. In the case of SMC and Vinyl Ester SMC Glass Fiber provided the desired tensile strength after one hour, but the tensile strength dramatically dropped off after 16 hours. Further investigation may be required to improve long-term performance.

TABLE 17

Celtran PP-GF 30-0553

| Formulation/Monomer | Activator | Surface | 1 hour (MPa) | 16 hour (MPa) |
|---|---|---|---|---|
| DEMM | None | Abraded | 0.66 +/- 0.15 | 1.37 +/- 0.33 |
| DEMM | Sodium Benzoate | Abraded | 1.50 +/- 0.11 | 0.71 +/- 0.43 |

TABLE 18

70G33HSIL (PA6,6)

| Formulation/Monomer | Activator | Surface | 1 hour (MPa) | 16 hour (MPa) |
|---|---|---|---|---|
| DEMM | None | Abraded | 1.87 +/- 0.15 | 1.94 +/- 0.25 |
| DEMM | Sodium Benzoate | Abraded | 1.53 +/- 0.43 | 1.55 +/- 0.20 |
| 1,6-hexanediol DiDEMM** | TMG | As Received | 2.86 +/- 0.32 | |

TABLE 19

CRASTIN (PBT)

| Formulation/Monomer | Activator | Surface | 1 hour (MPa) | 16 hour (MPa) |
|---|---|---|---|---|
| DEMM | Sodium Benzoate | Abraded | 2.22 +/- 0.20 | 1.72 +/- 0.78 |

TABLE 20

TRC 779X (TPO)

| Formulation/Monomer | Activator | Surface | 1 hour (MPa) | 16 hour (MPa) |
|---|---|---|---|---|
| DEMM | None | Abraded | 1.58 +/- 0.06 | 1.24 +/- 0.11 |
| DEMM | Sodium Benzoate | Abraded | 1.58 +/- 0.11 | 0.71 +/- 0.25 |
| Formula 3 | TMG | As Received | 0.35 +/- 0.05 | |

TABLE 21

1503-2F (PA6,6)

| Formulation/Monomer | Activator | Surface | 1 hour (MPa) | 16 hour (MPa) |
|---|---|---|---|---|
| DEMM | None | Abraded | 2.10 +/- 0.48 | 2.26 +/- 0.11 |
| DEMM | Sodium Benzoate | Abraded | 1.34 +/- 0.93 | 1.57 +/- 0.53 |
| 1,6-hexanediol DiDEMM** | TMG | As Received | 1.98 +/- 0.50 | |

TABLE 22

SMC Random

| Formulation/Monomer | Activator | Surface | 1 hour (MPa) | 16 hour (MPa) |
|---|---|---|---|---|
| DEMM | None | Abraded | 1.01 +/- 0.18 | 1.18 +/- 0.25 |
| DEMM | Sodium Benzoate | Abraded | 1.60 +/- 0.58 | 2.90 +/- 0.83 |
| 1,6-hexanediol DiDEMM** | TMG | As Received | 3.77 +/- 0.38 | 2.90 +/- 0.49 |
| Formula 3 | TMG | As Received | 3.53 +/- 0.19 | |

TABLE 23

Vinyl Ester SMC Glass Fabric

| Formulation/Monomer | Activator | Surface | 1 hour (MPa) | 16 hour (MPa) |
|---|---|---|---|---|
| DEMM | None | Abraded | 2.62 +/- 0.19 | 2.98 +/- 0.40 |
| DEMM | Sodium Benzoate | Abraded | 2.17 +/- 1.09 | 1.66 +/- 0.22 |
| 1,6-hexanediol DiDEMM** | TMG | As Received | 5.57 +/- 0.47 | 2.52 +/- 0.86 |
| Formula 3 | TMG | As Received | 4.42 +/- 0.53 | |

Details:

TMG = 0.5 wt. % 1,1,3,3-tetramethylguanidine in ethanol and sodium benzoate = 0.5 wt. % sodium benzoate in ethanol.

The experiments discussed above demonstrate successful adhesive bonding on plastic (or plastic composite) substrates. It is observed that certain substrates with reaction initiators at or near the substrate surfaces may be readily bonded with the exemplary adhesive formulations. Thus, adhesive systems may be developed that provide a reactive adhesive formulation able to react, i.e., polymerize, with brought into engagement with an initiator. The initiator may be on or near the surface of the substrate. In some cases, the reactive adhesive formulation is able to solvate the substrate surface so that the reaction occurs within and between the substrates to create an interpenetrating polymer weld.

Certain of the examples disclosed above comprise a multifunctional methylene malonate. Patent Document WO2013/059473, entitled Multifunctional Monomers, Methods for Making Multifunctional Monomers, Polymerizable Compositions and Products Formed Therefrom, incorporated herein by reference in its entirely, discloses several multifunctional methylene malonates suitable for plastics bonding applications.

Additional examples of the plastics bonding principles disclosed herein are provided in the following table. The examples illustrate bonding between similar and dissimilar substrates, and compares tensile strength with a commercially available cyanoacrylate product, Loctite 420.

TABLE 24

Adhesive properties of DEMM and Cyanoacrylate with plastic substrates

| Substrate 1 | Substrate 2 | *Fixture (min) | Tensile (psi) (DEMM) | Failure Mode (DEMM) | Tensile (psi) Cyanoacrylate | Failure Mode (Cyanoacrylate) |
|---|---|---|---|---|---|---|
| Royalite (ABS) | Royalite (ABS) | 4:30 | 725 +/− 100 | Substrate Failure | 821 +/− 242 | Adhesive |
| Royalite (ABS) | Royalite (ABS) | 5:30 | 790 +/− 54 | Adhesive | 667 +/− 103 | Adhesive |
| Makrolon (PC) | Makrolon (PC) | 1:30 | 1862 +/− 418 | Substrate Failure | 826 +/− 132 | Adhesive |
| Plexiglass (PMMA) | Makrolon (PC) | 4:30 | 826 +/− 96 | Substrate Failure | 542 +/− 77 | Substrate Failure |

Tensile strength at 1 hour; ASTM D3163. Lap shear 1" × 4", ).5" overlap, pulled at 0.5" per minute. Failure Mode reports the major mode of failure exhibited for each sample set.
*Fixture time measured as time to hold 0.1N for 10 seconds.

Additional studies were made on glass filled polypropylene samples. The following formulations were utilized in the study:
1) DEMM monomer (95% purity)
2) A thickened formulation in accordance with Table 25.

TABLE 25

DEMM Adhesive Formulation 2

| Component | Percent (%) |
|---|---|
| DEMM (95 wt %)* | 90.3 |
| Degacryl M449 PMMA | 9.5 |
| Aerosil R-812 Fumed Silica | 0.2 |
| Total | 100 |

*remaining 5% predominately comprises Diethyl Malonate (DEM)

The substrates used for testing were samples of Celtran glass filled polypropylene at four levels of glass fiber content: 20%, 30%, 40%, 50% filled. Unabraded panels were used as a reference. The bonding area was cleaned with ethanol. The bonded samples were assembled with 1-inch overlap. Certain of the substrates were pretreated with a drop of activator, 25 ppm KOH in ethanol, prior to application of the adhesive composition. Assembled specimens were allowed to cure for 24 hours before testing lap shear strength. The results are shown in Table 26.

TABLE 26

Tensile strength as a function of glass fiber loading

| Adhesive | Unabraded Panels | 20% GF | 30% GF | 40% GF | 50% GF |
|---|---|---|---|---|---|
| Formula 1 | No initiation | 164 | 228 | 268 | 279* |
| Formula 2 | No initiation | 226 | 206 | 267 | 303* |
| Formula 1 with Activator | No initiation | n/a | n/a | 323 | 305 |

GF: glass fiber, expressed as wt %. All values in pounds per square inch (psi).
*Processing defects in the substrates prevented good mating between bonding surfaces Observations: Table 26 shows a correlation between increased glass content and increased tensile strength on abraded panels. In this study, no activation was observed on non-abraded panels, suggesting that access to the glass fibers facilitated initiation of the reactive component (e.g., DEMM monomer).

Exemplary embodiments disclosed herein include bonded articles of similar and dissimilar substrates, with and without and activating primer. Table 27a, 27b, 27c and 27d provide the tensile testing results. In the following tables, in reference to Failure Mode, "Coh" means cohesive failure within the adhesive, "Ad" means adhesive failure, "Sub" means substrate failure. In Ad failure, "( )" provides the locus of the failure. In Sub failure, "( )" provides the substrate that failed.

TABLE 27a

Tensile Strength of bonded samples

| | PC/PC | PC/Acrylic | PC/PVC | PC/ABS | PC/PE | PC/Nylon | PE/PVC |
|---|---|---|---|---|---|---|---|
| Fixture Time | 15 sec | 10 sec | 15 sec | 40 sec | 80 sec | 30 sec | >60 min |
| Tensile (psi) | 1200 +/− 100 | 890 +/− 10 | 110 +/− 20 | 850 +/− 30 | 0 | 70 +/− 10 | 0 |
| Failure Mode | Sub | Sub(Acrylic) | Coh | Sub(ABS) | Ad (PE) | Ad (Nylon) | Ad(PE) |

99 wt % DEMM with 1000 ppm MeHQ, no acid stabilizer, No primer

TABLE 27b

Tensile Strength of bonded samples

| | Acrylic/Acrylic | Acrylic/PVC | Acrylic/ABS | Acrylic/PE | Acrylic/Nylon | PE/Nylon | PE/PE |
|---|---|---|---|---|---|---|---|
| Fixture Time | 40 sec | 6 min | 15 sec | 12 min | 10 min | >60 min | >60 min |

TABLE 27b-continued

Tensile Strength of bonded samples

|  | Acrylic/Acrylic | Acrylic/PVC | Acrylic/ABS | Acrylic/PE | Acrylic/Nylon | PE/Nylon | PE/PE |
|---|---|---|---|---|---|---|---|
| Tensile (psi) | 750 +/− 10 | 220 +/− 80 | 800 +/− 100 | 0 | 70 +/− 20 | 0 | 0 |
| Failure Mode | Sub | Coh | Coh | Ad (PE) | Ad (Nylon) | Ad(PE) | Ad |

99 wt % DEMM with 1000 ppm MeHQ, no acid stabilizer, No primer

TABLE 27c

Tensile Strength of bonded samples

|  | ABS/ABS | ABS/PVC | ABS/PE | ABS/Nylon | PVC/PVC | PVC/Nylon | Nylon/Nylon |
|---|---|---|---|---|---|---|---|
| Fixture Time | 20 sec | 30 sec | 30 sec | 3 min | >60 min | >60 min | >60 min |
| Tensile (psi) | 800 +/− 20 | 890 +/− 10 | 350 +/− 100 | 30 +/− 10 | 0 | 0 | 0 |
| Failure Mode | Sub | Ad (PVC) | Ad (PE) | Ad (Nylon) | Ad | Ad (Nylon) | Ad |

99 wt % DEMM with 1000 ppm MeHQ, no acid stabilizer, No primer

TABLE 27d

Tensile Strength of bonded samples

|  | PVC/PVC | PVC/Nylon | PVC/PE | PE/PE | PE/Nylon | PE/PC | PE/Acrylic | Nylon/Nylon |
|---|---|---|---|---|---|---|---|---|
| Fixture Time | 5 sec | 5 sec | 5 sec | 5 sec | 5 sec | 5 sec | 5 sec | 5 sec |
| Tensile (psi) | 500 +/− 50 | 180 +/− 40 | 0 | 20 +/− 10 | 30 +/− 10 | 30 +/− 10 | 20 +/− 10 | 170 +/− 10 |
| Failure Mode | Coh | Ad (Nylon) | Ad (PE) | Coh | Ad (PE) | Ad (PE) | Ad(PE) | Coh |

99 wt % DEMM with 1000 ppm MeHQ, no acid stabilizer, 0.25 wt % Tetra-n-butylammonium fluoride (TBAF) as primer An exemplary adhesive formulation may provide a carrier component to enhance solvation of the substrate. In certain substrates, the basic nature of the glass reinforcing material is sufficient to initiate anionic polymerization of the monomer.
Scheme I:
In an exemplary embodiment, a plastics bonding composition includes a reactive monomeric component and a carrier component. The reactive monomeric component may comprise a methylene malonate monomer. Alternately, or in addition to, the reactive component may comprise a reactive multifunctional monomer, a methylene beta ketoester, a methylene beta diketone or other exo-methylene derivative compound as defined herein, or any combination thereof.

In one exemplary embodiment, the carrier component is selected to interact with a suitable plastic substrate to soften and/or penetrate the surface to be bonded. Thus, the carrier component may act similarly to a solvent welding composition. However, unlike compositions in known solvent welding applications, exemplary embodiments disclosed herein include a reactive component able to polymerize to provide improved adhesive bonding. In an exemplary embodiment, the reactive component is anionically polymerizable, i.e., initiated by a base or material with basic attributes.

In exemplary embodiments, the polymerization of the reactive component may result in long-chain polymers or shorter-chain polymers. Increasing or decreasing access of the reactive component to a suitable initiator (also herein, "activator") may tailor the extent of such polymerization, as particular applications require.

In an exemplary embodiment, the plastic substrate, at least near the surface to be bonded, may include certain initiators (i.e., activators) for the reactive monomeric component. The initiator need only be present in amounts suitable to initiate polymerization. In exemplary embodiments, perfect mixing or stoichiometric amounts of initiator are not required. The initiator may be present in the plastic substrate, at least near the surface to be bonded, as a discrete phase in the plastic matrix material, or otherwise present in the plastic matrix material. In other exemplary embodiments, the initiator may be applied as a primer. In other exemplary embodiments, the plastic substrate may be doped with a suitable amount of initiator. In other exemplary embodiments, the initiator may be soluble in the carrier component. In other exemplary embodiments, the initiator may be present, but in an inert state (with respect to initiating polymerization of the reactive component) until acted on by heat, UV radiation, or other activating mechanism. As used herein "inert state" means that the initiator may be in a temporary unreactive form, or it may be encapsulated or otherwise isolated from the reactive component until an activating event, e.g., heat, radiation, chemical or physical change, occurs. For example, the initiator may be encapsulated in a wax, or may be present as an inactive salt.

In an exemplary embodiment, the carrier component carries the reactive monomeric component into the plastic substrate, where upon suitable initiation, the reactive component reacts (polymerizes) to create an adhesive bond. In some exemplary embodiments, the carrier component may also provide a solvent weld, i.e., may solvate the material and allow intermingling of polymer chains as discussed above. Thus, in some exemplary embodiments, the carrier component solvent weld may provide initial green strength to bond the plastic surfaces, and the reactive component may provide a final adhesive bond.

Example

DEMM with DEM as Carrier

In one example, a plastics bonding composition comprises diethyl malonate (DEM) as a carrier component and diethyl methylene malonate (DEMM) as the reactive monomeric component. An exemplary plastic to be bonded may include "tailored" polystyrene. In this context, "tailored" means that the polystyrene is amendable to the bonding process disclosed herein, for example, by priming the surface, by doping the plastic with a suitable amount of initiator, by an initiator already present in the plastic matrix, and the like. In this example, the plastics bonding composition may be applied to each surface of the plastic substrate to be bonded. The DEM enters the substrate and carries the DEMM into the polystyrene a sufficient distance as measured from the plastic surface. The surfaces to be bonded are brought into contact and the reactive monomer, e.g., DEMM, contacts the initiator and polymerizes to create the adhesive bond between the two surfaces.

An exemplary embodiment disclosed herein comprises an adhesive composition including non-reactive, generally non-volatile carrier such as diethyl malonate. Exemplary embodiments further include reactive di-substituted vinyl compositions such as a methylene malonate, a methylene beta diketone, or a methylene beta ketoester. The reactive species may be amenable to anionic polymerization.

Scheme II:

In an exemplary embodiment, a plastics bonding composition includes a reactive monomeric component that is carried in a second monomeric component that acts as the carrier component. This scheme may be important for situations where no residual solvent should remain in the plastic substrate. In other words, this aspect creates a fully reactive system. Exemplary reactive monomeric components may be any of the monomers provided above, i.e., exo-methylene derivative monomers. The second monomeric component may likewise be any of the exo-methylene derivative monomers, different from the first monomeric component. Suitable initiators must be made available to the reactive components, for example, by primers, or through embedding or dispersing in the plastic substrate in some manner. One of the reactive components may be more readily reactive than the other to provide an initial adhesive bond, while the other component may be utilized, for example, to provide greater strength, toughness, or other desired quality.

Example

Difunctional Monomer/DEMM Blend

Formulas 3, 5, 7 and 8 provided above are examples of a reactive component (1,6-hexanediol diDEMM) carried in a reactive carrier (DEMM).

Scheme III:

In another exemplary embodiment, a plastics bonding composition includes a reactive component selected from cyanoacrylates, epoxies, urethanes, polyurethanes, acrylics, silicones, and the like that is carried in a non-reactive, generally non-volatile carrier component. As discussed above, the carrier component may soften or solvate the plastic to allow penetration of the reactive component within the substrate at the surface to be bonded.

Scheme IV:

In another exemplary embodiment, a plastics bonding composition includes a reactive component (e.g., a methylene malonate or related material) that is carried in a different reactive carrier component. Exemplary reactive components may be any of the exo-methylene derivative monomers discussed above. The other reactive component, the carrier component, may be selected from other reactive adhesives such as cyanoacrylates, epoxies, urethanes, polyurethanes, acrylics, silicones and the like.

Suitable initiators must be made available to the reactive components, for example, by primers, or through embedding or dispersing in the plastic substrate in some manner. One of the reactive components may be more readily reactive than the other to provide an initial adhesive bond, while the other component may be utilized, for example, to provide greater strength, toughness, or other desired quality.

Example

DEMM with CA

Exemplary adhesive formulations were prepared by blending diethyl methylene malonate (DEMM) with a commercially available cyanoacrylate (CA) adhesive designed for polystyrene model building, obtained from Hobbytown USA. The exemplary formulations were, by weight:

Adhesive A: 5% DEMM, 95% CA
Adhesive B: 10% DEMM, 90% CA
Adhesive C: 15% DEMM, 85% CA
Control: 100% CA.

The exemplary adhesives were applied to bondable surfaces of a polystyrene plastic available in a model building set. The following approximate cure times were observed:

Adhesive A: Green strength 5 seconds, cure time 90 seconds.
Adhesive B: Green strength 5 seconds, cure time 30 seconds.
Adhesive C: Green strength 5 seconds, cure time 20 seconds.
Control: Green strength 10 seconds, cure time 2 hours.

One additional observation is that the faster cure time of the blended exemplary adhesives provided a clear bond on the clear plastic model pieces (e.g., windows, mirrors) whereas the clear pieces glued with the control adhesive presented greater opportunity for smudging due to the longer cure time.

Because of the difference in observed cure time for the exemplary adhesives A-C, it is postulated that certain impurities within the plastic substrate acted as polymerization initiators for the reactive DEMM.

Initiators suitable for use in the practice of the present invention vary widely. Selection of the specific initiator(s) depends on the chemistry of the reactive component, the nature of cure mechanisms employed, the method and/or conditions by which polymerization is to be effectuated, the end-use applications and/or the nature of any substrate. The initiators may include those involved with the polymerization of one or more reactive components, monomers, pre-polymers, and/or low molecular weight polymers or oligomers, including for example, activators, co-activators, accelerators, co-accelerators, catalysts, co-catalysts, initiators and co-initiators. Of general interest for the di-activated vinyl monomers such as methylene malonates, multifunctional methylene malonates, methylene beta-ketoesters, methylene beta-diketones, and related materials are bases, base precursors, base converters, and base enhancers. Exemplary initiators may initiate polymerization of the reactive component primarily through anionic attack. Other exemplary initiators may initiate polymerization primarily through free radical mechanisms.

Exemplary initiators include any material capable of enabling cure or speeding the rate of cure of the reactive component. Exemplary initiators include, but are not limited to salts of organic acids, sodium, potassium, lithium acetate; acrylic, maleic or other acid salts of sodium, potassium, lithium, copper, cobalt, or other metal cations; salts such as tetrabutyl ammonium fluoride, chloride, bromide, iodide or hydroxide; or chemically basic materials such as amines and amides; or salts of polymer bound acids; benzoate salts; 2-4, pentanedionate salts; sorbate salts; or propionate salts. Additional initiators include benzoic acid; acetic acid; bicarbonates; carbonates; inorganic basic materials; clay; commercially available PC, ABS or other polar polymers; super bases; guanidines; amidines (e.g., DBU, 1-8-diazabicycloundec-7-ene); imines; thiols and other sulfur-containing compounds; salts of alcohols such as lithium phenoxide; and the like.

Certain articles may be amenable to bonding using the reactive components as disclosed herein. For example, many of the substrates utilized in 3D printing processes may be bonded using the principles disclosed herein. For example, assemblies or sub-assemblies formed from ABS, PC, polylactic acid (PLA), PC/ABS, high density polyethylene (HDPE), and polyphenyl sulfone (PPSU); polyether imide (PEI) during a 3D printing process may be assembled using the exemplary bonding systems.

Exemplary embodiments of the present invention include certain articles of manufacture, in particular automotive interior components, that comprise at least one plastic substrate. Examples include door and trim panels, instrument panels, consoles, cockpits, floor components, acoustic systems, headliners, and overhead systems.

Demonstrations have also been made of bonding polycarbonate substrates to PET-G, steel, aluminum, glass, and various wood substrates, with and without primers or surface activators.

In certain examples, as-received plastic substrate samples were abraded prior to bonding to expose the initiator for the reactive component. In other examples, the surface of the plastic substrate was able to initiate cure. In yet other examples, a surface activator or primer was utilized to effect cure.

Those skilled in the art will recognize, or be able to ascertain using no more than routine experimentation, many equivalents to the specific embodiments of the invention described herein. Such equivalents are intended to be encompassed by this invention.

What is claimed is:

1. A system comprising:
    a reactive component curable after exposure to a reaction initiator, wherein the reactive component comprises one or more members selected from the group consisting of a methylene malonate component, a methylene beta-ketoester component, a methylene beta-diketone component, and an oligomer or resin thereof;
    a first substrate formed of a plastic material and comprising the reaction initiator, the reaction initiator incorporated into the first substrate; and
    wherein the reactive component further comprises a carrier component; and
    wherein the plastic material and the reaction initiator are different.

2. The system according to claim 1, wherein the carrier component is partially soluble with the first substrate.

3. The system according to claim 2, wherein the carrier component comprises an additional reactive component.

4. The system according to claim 1, wherein the reactive component comprises one or more of a mono-functional and a multifunctional methylene malonate component.

5. The system according to claim 1, wherein the carrier component comprises one or more members selected from the group consisting of cyanoacrylates, epoxies, urethanes, polyurethanes, acrylics, and silicones.

6. The system according to claim 1, wherein the reactive component is cured.

7. A bonded article formed from the cured system of claim 1, further comprising a second substrate, wherein the reactive component is disposed between the first substrate and the second substrate.

8. The bonded article according to claim 7, wherein the second substrate is formed of a glass material, a metal material, a wood material, or another plastic material.

9. The bonded article according to claim 7, wherein the first substrate and the second substrate are formed of different materials.

10. A method for bonding a first substrate formed of a plastic material to a second substrate, wherein the first substrate comprises a reaction initiator incorporated into the first substrate, the method comprising:
    a) providing a reactive component on the surface of the first substrate, the reactive component further comprising a carrier component;
    b) exposing the reactive component to the reaction initiator; and
    c) engaging at least a portion of the first substrate with the second substrate to create a bonding engagement; and
    wherein the reactive component comprises one or more members selected from the group consisting of a methylene malonate component, a methylene beta-ketoester component, a methylene beta-diketone component, and an oligomer or resin thereof;
    wherein the plastic material and the reaction initiator are different.

11. A kit comprising:
    a first substrate formed of a plastic material and comprising a reaction initiator, the reaction initiator incorporated into the first substrate;
    a second substrate; and
    a plastic bonding adhesive composition comprising a reactive component effective to bond the first substrate to the second substrate upon exposure to the reaction initiator and a carrier component, wherein the reactive component comprises one or more members selected from the group consisting of a methylene malonate component, a methylene beta-ketoester component, a methylene beta-diketone component, and an oligomer or resin thereof; and wherein the plastic material and the reaction initiator are different.

* * * * *